(12) United States Patent
Gregg et al.

(10) Patent No.: US 6,577,848 B1
(45) Date of Patent: Jun. 10, 2003

(54) DISPATCH SYSTEM AND METHOD OF ASSIGNING A SHARED CHANNEL TO REMOTE UNITS

(75) Inventors: Ralph Charles Gregg, Tempe, AZ (US); Michael William Krutz, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/404,871

(22) Filed: Jan. 21, 1998

Related U.S. Application Data

(63) Continuation of application No. 08/453,417, filed on May 30, 1995, now abandoned.

(51) Int. Cl.[7] ................................................ H04B 2/19
(52) U.S. Cl. ........................ 455/13.2; 455/519; 455/521
(58) Field of Search ............................... 455/12.1, 13.1, 455/450, 447, 451, 452, 427, 509, 101, 426, 428, 430, 518, 519, 520, 521

(56) References Cited

U.S. PATENT DOCUMENTS

| | | | | |
|---|---|---|---|---|
| 4,012,597 A | * | 3/1977 | Lynk, Jr. et al. | 179/41 |
| 5,303,393 A | * | 4/1994 | Noreen et al. | 455/3.2 |
| 5,365,590 A | * | 11/1994 | Brame | 455/33.1 |
| 5,548,802 A | * | 8/1996 | Barnes et al. | 455/15 |
| 5,734,645 A | * | 3/1998 | Raith et al. | 370/329 |
| 5,815,799 A | * | 9/1998 | Barnes et al. | 455/512 |

* cited by examiner

*Primary Examiner*—Lester G. Kincaid
*Assistant Examiner*—Tilahun Gesesse
(74) *Attorney, Agent, or Firm*—Harold C. McGurk, IV; James E. Klekotka

(57) ABSTRACT

A dispatch system (10) uses satellites (40) to broadcast simultaneously to an individual remote unit (30), to a select group of remote units (30) or to all the remote units (30). The dispatch system (10) may assign a remote unit (30) to a unique channel if there are enough available channels, or may assign the remote units (30) to a shared channel when the number of available channels is limited. The remote units (30) are given a unique control code or a shared control code. Based on the channel and the control code, the remote unit (30) will be able to listen to the broadcast or ignore it.

13 Claims, 3 Drawing Sheets

DISPATCH SYSTEM AND METHOD OF ASSIGNING A SHARED CHANNEL TO REMOTE UNITS

This a continuation of application Ser. No. 08/453,417, filed May 30, 1995, now abandoned.

TECHNICAL FIELD

This invention relates generally to communication systems and, in particular, to dispatch systems and methods for assigning remote units to individual or shared channels in a dispatch service.

BACKGROUND OF THE INVENTION

Traditional dispatch services support a variety of services in urban or remote areas, including for example trucking, delivery, taxi, public transportation and law enforcement. Dispatch services are also particularly suited for temporary and emergency setups such as search and rescue, fire fighting (domestic and forest) and remote medical teams. Most dispatch services are terrestrial-based, meaning that the antennas used for transmitting voice or data from the dispatch service directly to the remote units are located on earth. However, if the antennas are damaged by an earthquake, hurricane or fire for example, the dispatch service is disabled until another antenna can transmit the information from the dispatch station directly to the remote units.

Therefore, there is a significant need for a satellite-based dispatch service that uses satellites to broadcast to remote units and which assigns remote units to a shared channel when the number of remote units exceeds the number of available channels.

DESCRIPTION OF THE PREFERRED EMBODIMENTS

A satellite-linked dispatch service provides flexible group communication for a wide range of business and municipal activities. It can provide reliable communications for supporting routine, repetitive business operations such as taxi fleets or law enforcement activities. It excels in the capability to provide flexible communications in the rapidly evolving environment imposed by civil emergencies and natural disasters. Satellite linking eliminates most of the expensive and time-consuming physical siting problems associated with conventional terrestrial communication systems. The service is easily installed in urban or remote areas, with or without connection to the existing local communication or telephone infrastructure. The size of the dispatch group or the geographic area of coverage can be changed quickly without significant alteration to physical communication assets, other than changing the number of base station dispatchers or the quantity of remote user communication sets.

Figure 1:
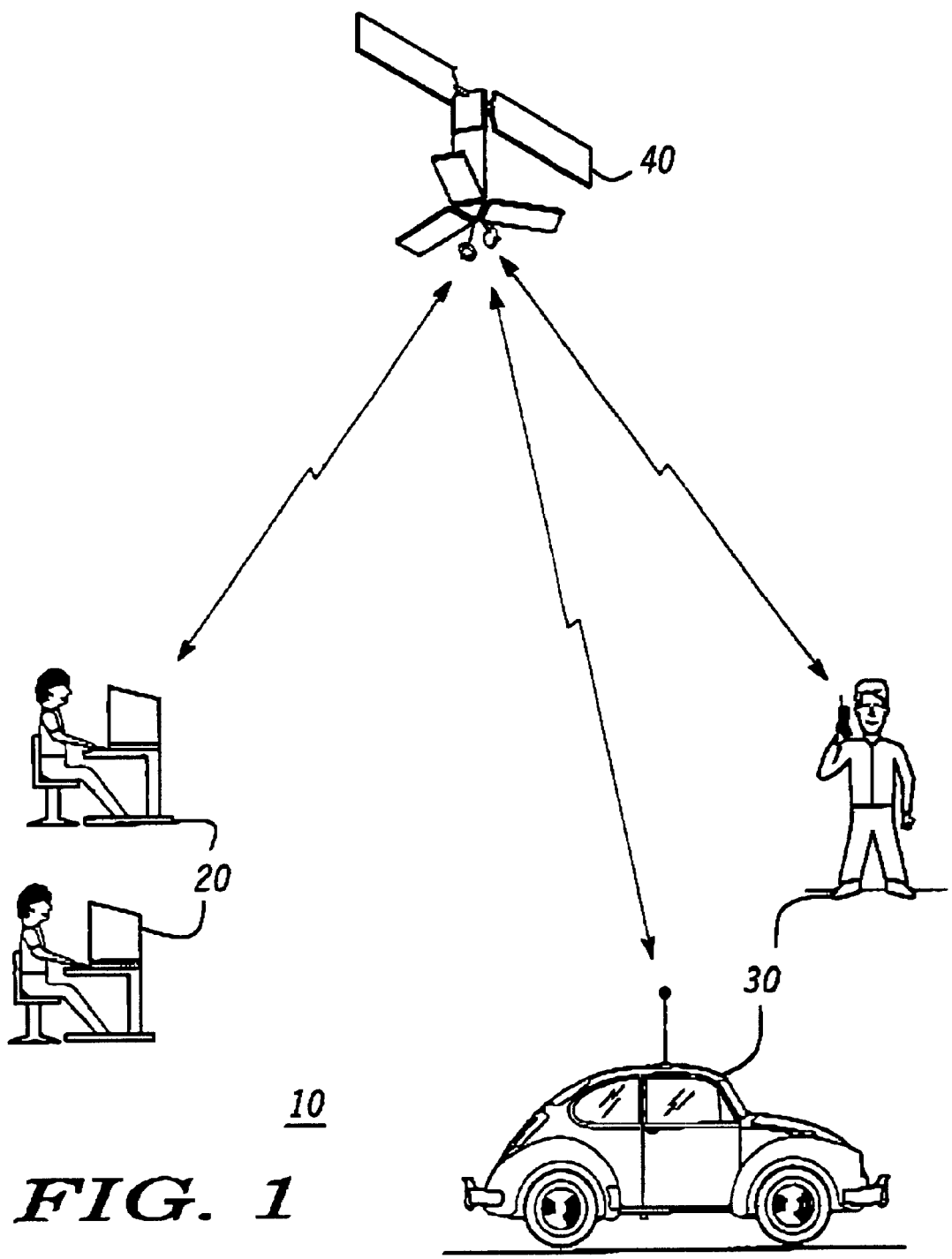
FIG. 1 illustrates a dispatch system in accordance with a preferred embodiment of the present invention.

FIG. 1 illustrates dispatch system or service 10 according to a preferred embodiment of the present invention. As shown in FIG. 1, dispatch system 10 comprises base station 20, any number of remote or subscriber units 30 and at least one satellite 40.

Dispatch station 20, also known as a base station, is where dispatchers communicate or broadcast information to remote units 30. Dispatch station 20 may use a separate connection or a unique channel assignment for each remote unit in the dispatch area based on the number of available channels or resources. Dispatch station 20 can also access one or any combination of remote units 30 at a time. Moreover, when there are more remote units 30 than channels, dispatch station 20 has the option of assigning the same channel to different remote units 30.

Figure 2:
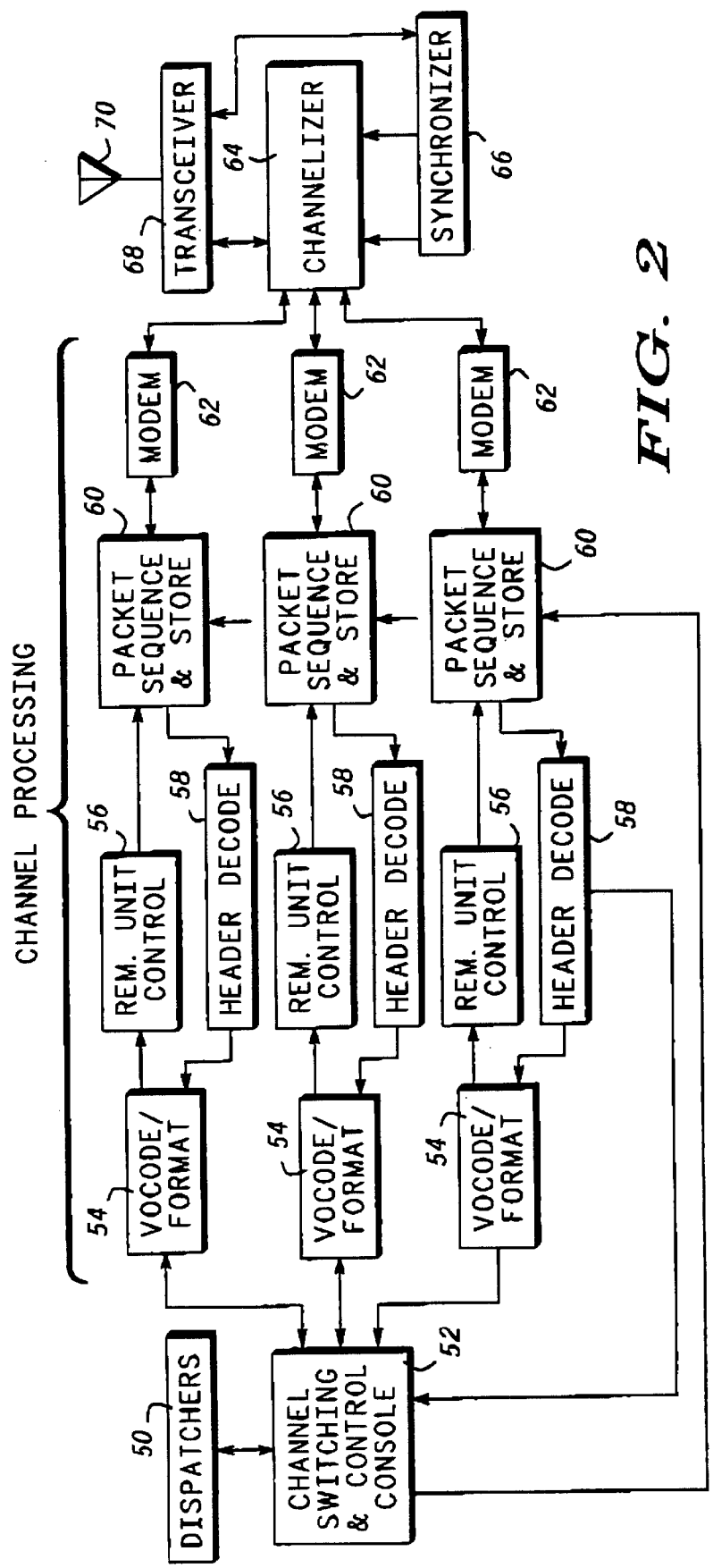
FIG. 2 shows functional elements of a dispatch station in accordance with a preferred embodiment of the present invention.

Dispatch station 20 is shown in FIG. 2 according to a preferred embodiment of the present invention. Dispatch station 20 comprises dispatchers 50, channel switching and control console unit 52, vocode/format units 54, remote unit control units 56, header decode units 58, packet sequence and store units 60, modems 62, channelizer 64, synchronizer 66, transceiver 68 and antenna 70. The elements shown in FIG. 2 can be used where a duplex communication channel is assigned to each remote unit 30, or where the complexity and/or operating costs of dispatch system 10 must be constrained or where the availability of satellite communication resources is limited. When the costs or resources are limited, the hardware communication pathways and associated satellite link channels are shared to provide communications with multiple links.

Dispatchers 50 are human or computer dispatchers who are broadcasting information to one or more remote units 30. Dispatchers 50 talk into a microphone that is transmitted to channel switching and control console 52. One or more dispatchers 50 operate channel switching and control consoles 52 to select a signal pathway and corresponding satellite link channel through the channel processing elements for communication with a particular remote unit 30, selected remote units 30 or all the remote units 30. A pathway is bi-directional, with the sequence and processes used for signal reception being reversed from those being used for signal transmission. Console 52 also generates the unit address and control codes that access and control the operation of remote units 30.

Input/output to console 52 may be voice or data signals. Analog voice signals are digitized and coded by a vocoder in vocode/format units 54. Data signals, used to convey alphanumeric information or any serial digital data stream, bypass vocode/format units 54. All signals are formatted into the proper segments or packets for link transmission.

When dispatcher 50 assigns a single remote unit 30 to a unique channel, remote unit address and control codes are added to the transmission packets in remote unit control units 56, and the resulting digital signals are modulated onto subcarriers by modems 62, bypassing packet sequence and store units 60. Packet sequence and store units 60 are used when dispatcher 50 assigns one remote unit 30 to a shared channel. Packet sequence and store units 60 prioritize and store packets for transmission and reception under the control of dispatcher 50.

Channelizer 64 translates the subcarrier frequencies to an uplink frequency with the appropriate packet timing and frequency offsets to insure that the signals arrive at the satellite within permissible time and frequency limits. Synchronizer 66 provides correction of the Doppler offset and propagation time variations in the satellite link signals. Synchronizer 66 derives the correct transmit timing and frequency control signals to operate channelizer 64 by continuously monitoring the control and reference signals provided by satellite 40. Transceiver 68 is controlled by synchronizer 66 to transmit to and receive from omnidirectional antenna 70 at specific time slots in time synchronization with satellite 40.

The satellite communication links may achieve channelization by using frequency-division multiplexing (FDM), time-division multiplexing (TDM) or a combination of both. A combination method is assumed, where the uplink and downlink signals are transmitted in bursts or packets on selected frequencies at specific time opportunities (time slots). However, other methods may be used as known to those of ordinary skill in the art, including code-division multiplexing (CDM).

When satellite 40 transmits to dispatch station 20, received downlink signals are separated, converted to channel subcarrier frequencies by channelizer 64 and applied to receive inputs at modem 62. Modems 62 demodulate the channel signals, while header decode unit 58 provides the unit identity code and other unit header information to control console 52. Vocode/format unit 54 re-assembles the bursts or packets into contiguous data and converts the data into analog voice signals (if voice signals are being used).

Remote units 30 can be any telecommunications device including pagers but are preferably cellular telephones which can transmit to and receive from satellite 40. Remote units 30 may also be a dual mode cellular telephone which can transmit to and receive from satellite 40 and/or terrestrial cellular equipment. Remote units 30 comprise at least a transceiver for receiving and transmitting packets of data and a processor for examining control codes to determine whether the call is addressed to this particular remote unit 30. The transceiver and processor are well known to those of ordinary skill in the art as well as the hardware architecture coupling these two elements.

The operation of dispatch system 10 typically requires that remote units 30 remain in an active receive state for long periods without specific unit dispatcher action. According to the method described herein, remote units 30 may maintain synchronization with satellite 40 in time and frequency by using the assigned channel resources as necessary for periodic uplink transmissions or downlink signal reception to maintain lock without interference to other units. That is, remote units 30 are capable of remaining in a receive condition for indefinite periods by a process that maintains unit synchronization with the system by automatically transmitting and receiving periodic synchronizing information. The user of remote unit 30 is normally unaware of the synchronization maintenance process.

A receive condition means that remote unit 30 is operating, tuned to the proper channel, and locked or synchronized to the correct downlink signal. A locked receiver is able to demodulate and decode any message sent via its assigned channel and output the voice or data to the user via the appropriate means.

Access to dispatcher 50 is controlled at dispatch station 20. Since each remote unit 30 occupies a single assigned channel or a shared channel, dispatcher 50 at dispatch station 20 can selectively or simultaneously communicate with remote units 30. When each remote unit 30 occupies a single assigned channel, no message coding is required within the channel structure. However, if it is necessary to increase system capacity temporarily or permanently, more than one remote unit 30 can be assigned to a channel set. There may exist the possibility of occasional interference between remote units 30 that may attempt to communicate to dispatcher 50 simultaneously or to access satellite 40 for synchronization maintenance.

FIG. 2 shows an example using three hardware pathways and corresponding satellite channels. However, any number of hardware pathways and satellite channels can be used. Heavy voice traffic may require the allocation of some pathways, specifically to voice function only, to provide for timely transmission and reception of these signals. Voice packets must be transmitted with limited delay and reassembled on reception so that the digital voice data can be converted to and from analog voice signals at the correct average rate, with acceptable end-to-end delay, and with no perceptible gaps in the reconstructed voice waveform. Other digital transmission services are less time-sensitive, so that data queue time is less critical and more communication entities generally can share the same channel.

Broadcasts to all remote units 30 or to groups of remote units 30 are accomplished using a single channel and alternate unit addresses, sometimes referred to as group codes. In addition, special control codes or characters in the remote unit control codes may be used for unit control associated with broadcasting or group addressing functions, discussed in further detail below.

Remote unit 30 produces an output perceptible to a user when a transceiver is activated by a message received on its assigned channel containing a correct code. The code categories may include: (1) a unique code for communication directed to one remote unit 30; (2) a code common to a group of remote units 30; and (3) a code common to all remote units 30 having the same channel assignment, typically used for broadcast transmissions by dispatch station 20.

To a remote unit user, remote unit 30 appears to operate as a conventional communication set with a squelched receiver, except that remote unit 30 responds only to directed messages. Remote unit 30 is quiet until it is activated by traffic transmitted on the assigned channel (and using the appropriate code, if applicable).

Doppler and timing offsets are characteristic of satellite downlink signals, with the effects becoming quite large for low-earth orbit (LEO) satellites 40. Efficient use of satellite communication resources requires accurate time synchronization for time-division multiplex (TDM) systems, or accurate frequency resolution and Doppler compensation in the case of frequency-division multiplex (FDM) systems. Accuracy in both realms is necessary for systems combining FDM/TDM technologies. An occasional or periodic two-way interchange of synchronization information between satellite 40 and remote units 30 may be necessary to maintain the required accuracy.

Dispatch service channel characteristics and associated equipment performance may contrast with conventional satellite communication in a few ways. First, greater allocated channel bandwidth may be needed to permit larger frequency errors without interference to other satellite services. Second, modems are required at both ends of the communication link which are more tolerant to frequency and timing errors, relieving the necessity for closed-loop corrections to maintain lock. Third, received signal flux density may have to be increased to permit rapid signal acquisition in spite of increased initial frequency error. Finally, pilot tones and/or longer preambles may be needed to enhance the signal acquisition process.

In a system where ground-based remote units 30 communicate directly with satellite 40 or a constellation of multiple low-earth satellites 40, the satellite end of the link must occasionally be handed-off from one satellite 40 servicing a given geographic area to the next satellite 40 coming into view. Since system operation requires that the satellite positions be accurately known, and the location of dispatch station 20 is usually fixed and known, the dispatch station link handoffs may be executed at scheduled intervals. However, dispatch station 20 may have some degree of mobility, e.g., the dispatch station 20 may be set up near the scene of a natural disaster or civil emergency. Remote units 30 also may have a degree of mobility that require modifications to the handoff process, depending on a maximum allowed distance of remote unit 30 from dispatch station 20.

If the maximum distance represents a small portion of the area defined by the intercept of the satellite antenna beam with the earth's surface, then remote unit 30 can be serviced by the same beam (cell) as dispatch station 20. The remote unit link can be handed-off simultaneously with the dispatch station link.

If the maximum distance represents a significant portion of the intercept area, then remote units 30 can be serviced by enabling the cell best servicing dispatch station 20 and the closest surrounding cell-set. Remote unit downlink information is transmitted in all cells of the set simultaneously to avoid the need to geolocate each mobile.

When dispatch station 20 is not located near a geographic center of the dispatch area, the most appropriate set of adjacent cells can be selected according to the cell pattern geometry. If the cell pattern overlap permits, remote units 30 in a particular cell can be handed-off simultaneously to the on-coming cell. Handoffs can be scheduled based on the cell geometry that defines cell shape and location relative to the dispatch station cell. However, any handoff method may be used which is well known to those of ordinary skill in the art.

In the case where the dispatch area size exceeds the intercept area significantly, either some form of remote unit geolocation must be implemented, or remote units 30 must search the channels of neighboring cells and determine, by measuring received signal strength, when to request a handoff and which of the on-coming cells is the best choice. Remote unit 30 transmits the data to satellite 40 or the entity controlling the handoff process as the anticipated time of the handoff approaches, minimizing the impact on the link traffic loading.

Satellite 40 provides the capability to link dispatch station 20 to remote units 30. Satellite 40 is preferably a satellite in a low-earth orbit, but the present invention applicable to any communication satellite system that provides adequate earth coverage that is capable of multi-channel digital data reception and retransmission, including the IRIDIUM® project Other types of communication satellites 40 could be used as well, such as those using repeater or "bent pipe" modes. Satellite 40 could also be in a medium-earth orbit or a geosynchronous orbit. The only requirement for satellite 40 is that the radio frequency signal characteristics are adequate to support communication with handheld or portable remote units 30 which have omni-directional antennas. How satellite 40 physically transmits the digital signals to and receives digital signals from dispatch station 20 and subscriber units 30 is well known to those of ordinary skill in the art.

Figure 3:
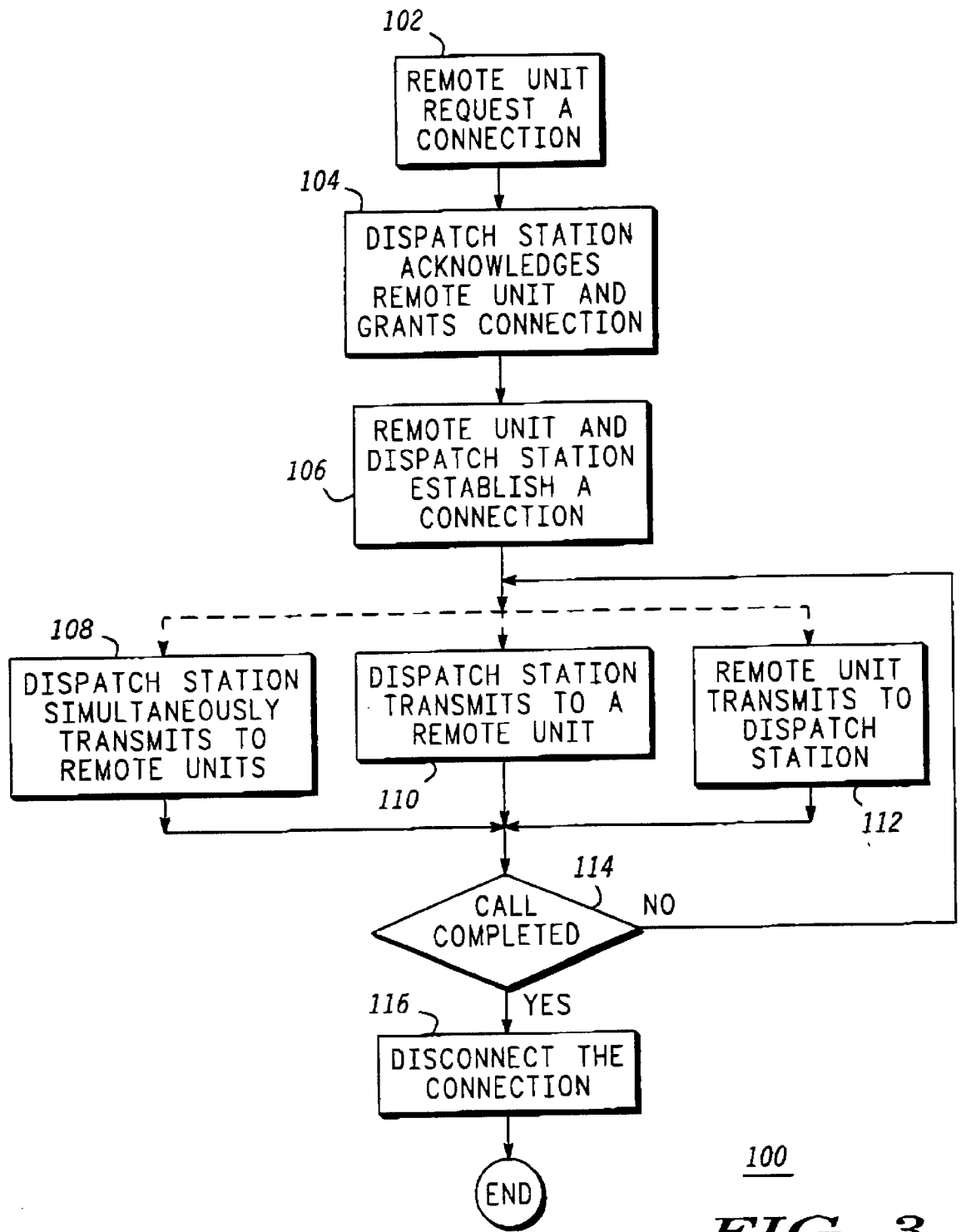
FIG. 3 shows a flowchart of a method of assigning a remote unit to a unique channel according to a preferred embodiment of the present invention.

FIG. 3 shows a flowchart of assigning a remote unit to a unique channel according to a preferred embodiment of the present invention. Method 100 applies when sufficient satellite communication channels or resources are and are not available. The case where there are a maximum number of remote units 30 in dispatch system 10 and where sufficient satellite communication channels are available to allow the assignment of a communication channel set or pair (one uplink channel and one downlink channel for duplex communication) for each remote unit 30 will discussed first. Each remote unit 30, when activated, may be allocated the use of one exclusive channel set.

A "connection" refers to an effective end-to-end duplex channel that is formed by the channel set for the dispatch station satellite link and the set used for the remote unit satellite link. A "connection" exists for each active remote unit 30.

In step 102 of method 100 shown in FIG. 3, remote unit 30 requests a connection to dispatch station 20 through satellite 40. Remote unit 30 may dial a special telephone number (i.e., dispatch station's 20 telephone number) which is transmitted through an uplink channel to satellite 40 and transmitted to dispatch station 20 on a downlink channel. Another method is to allocate a separate, special function channel for acquisition. There are other methods known to those of ordinary skill in the art to make a connection between remote unit 30 and dispatch station 20 through satellite 40. Dispatch station 20 acknowledges remote unit 30 in step 104 by sending an acknowledge signal back through satellite 40 to remote unit 40.

In step 106, remote unit 30 and dispatch station 20 establish a connection. In other words, remote unit 30 registers with dispatch station 20. Preferably, the connection will comprise a fill duplex channel that is not shared with any other remote unit 30. Moreover, in the preferred embodiment, a connection is formed between dispatch station 20 and satellite 40, and between remote unit 30 and satellite 40, to effectively connect dispatch station 20 to remote unit 30.

After dispatch station 20 and remote unit 30 establish in step 106 a connection to each other through satellite 40, steps 108, 110 or 112 can occur in any order until the call is completed. In step 108, dispatcher 50 simultaneously broadcasts to all remote units 30, whereby each remote unit 30 will hear the dispatcher's communication. As shown in FIG. 2 and discussed above, the dispatcher's analog voice signal is simultaneously transmitted over each of the assigned channels. Each remote unit 30 will hear the dispatcher's 50 communication.

In step 110, dispatch station 20 may transmit to a specific remote unit 30 by using a unique, assigned channel or a shared channel with a unique control code. Dispatch station 20 may transmit to a group of remote units 30 by using unique channels with shared control codes or a shared channel with a shared control code. As previously mentioned, control codes are assigned to subscriber units 30 by dispatcher 50. How dispatcher's 50 analog voice signal is converted into a digital signal and then processed and transmitted to satellite 40 and from satellite 40 to dispatch station 20 is described as it relates to FIG. 2.

In step 112, remote unit 30 may transmit to dispatch station 20 in accordance with a preferred embodiment of the present invention. However, some remote units 30 may be receive only devices and may not be able to transmit to dispatch station 20, such as a pager unit, for example.

After the remote unit user and dispatcher 50 are done communicating, method 100 determines whether the call is completed in step 114. If the call is on-going, method 100 returns to step 108, step 110 or step 112 to wait for the next person to talk. If the call completes, method 100 terminates in step 116 and the connection between the dispatch station 20 and remote unit 30 (and through satellite 40) is disconnected or terminated. How a call is terminated is well known to those of ordinary skill in the art.

The flowchart of FIG. 3 is also used when a remote unit 30 is assigned to a shared channel when the number of remote units 30 exceed the number of available channels. Steps 102, 104 and 106 perform the steps of acquisition, registration and establishing a connection respectively. When dispatch station 20 assigns a connection to remote unit 30 in step 106, dispatch station 20 assigns a frequency and time slot (i.e., a channel) and a control code to remote unit 30. The control code may be unique or shared among remote units 30. If it is unique, remote unit 30 may share the same channel as other remote units 30, but the other remote units 30 will not be able to hear the dispatcher's 50 communication unless it has the proper control code. When the control code is shared among a group of remote units 30, dispatcher 50 can broadcast to each remote unit 30 having the same or shared control code. By using shared control codes, dispatcher 50 can transmit to select groups of remote units 30 where each group shares the same control code. If all remote units 30 have the same control code, then dispatcher 50 can transmit to all the remote units 30 simultaneously, This feature is important to notifying all the remote units 30 at the same time of extremely urgent and critical news.

The control code is preferably a temporary number; however, the control code may be an encrypted character or alpha-numeric symbol, Those of ordinary skill in the art will recognize that the control code may be for example, any number, character, symbol or sound. The control code is assignable by dispatcher 50.

When dispatch station 20 is communicating to remote unit 30 in steps 108, and 110, dispatcher 50 needs to know the control code (individual, group, or all remote units) before sending a transmission. This enhanced method provides dispatcher 50 the ability to assign a remote unit 30 to a shared channel when channel resources are limited. However, remote unit 30 may still have a special communication link with dispatch station 20 by having a unique control code.

It will be appreciated by those skilled in the art that the present invention satisfies a significant need for a satellite-based dispatch service that uses satellites to broadcast to remote units and which assigns remote units to a shared channel when the number of remote units exceeds the number of available channels.

Accordingly, it is intended by the appended claims to cover all modifications of the invention that fall within the true spirit and scope of the invention.

What is claimed is:

1. A dispatch system, comprising:

a plurality of the remote units;

a dispatch station configure to assign to each of the remote units one plurality of available channels if a number of the available channels exceeds a number of the remote units, to assign one of a plurality of share channels and a unique control code to at least one of the remote units when the number of remote units exceeds the number of available channels and the at least one of the remote units is to be individually addressed by the dispatch station, and to assign a common one of the shared channels and a shared control code to each of the remote units in a group; and a satellite for receiving data from the dispatch station and for broadcasting the data to the remote units.

2. A dispatch system as recited in claim 1, wherein the dispatch station includes means for receiving second data from the satellite.

3. A dispatch system as recited in claim 1, wherein the dispatch station includes means for assigning a shared channel to the remote units.

4. A dispatch system as recited in claim 1, wherein the dispatch station includes means for assigning each of the remote units to a shared channel and a unique control code.

5. A dispatch system as recited in claim 1, wherein the dispatch station includes means for assigning remote units to a shared channel and a shared control code.

6. A dispatch system as recited in claim 1, wherein the remote units are cellular telephones capable of communicating with the satellite.

7. A dispatch system as recited in claim 1, wherein the remote units include means for communicating with the satellite and with terrestrial-based cellular system.

8. A dispatch system as recited in claim 1, wherein the remote units include means for receiving data over a shared channel and determining whether the data are addressed to this remote unit based on a control code.

9. A dispatch system as recited in claim 1, wherein the satellite is a low-earth orbit satellite.

10. A dispatch system as recited in claim 1, further comprising a plurality of satellites, each satellite coupling the data to at least one adjacent satellite.

11. A method of communicating between a dispatch station and a plurality of remote units, comprising the steps of:

a) assigning to each of the remote units one of a plurality of available channels if a number of the available channels exceeds a number of the remote units;

b) assigning one of a plurality of shared channels and a unique control code to at least one of the remote units if the number of remote units exceeds the number of available channels and the at least one of the remote units is to be individually addressed by the dispatch station;

c) assigning a common one of the shared channels and a shared control code to each of the remote units in a group;

d) broadcasting data to a satellite; and e) broadcasting the data to the remote units from the satellite.

12. A method as recited in claim 11, further comprising the steps of:

each of the remote units requesting a connection;

the dispatch station acknowledging each of the remote units and granting the connection; and establishing a connection between each of the remote units and the satellite and the dispatch station and the satellite.

13. A method as recited in claim 11 further comprising the steps of:

d) receiving the data over the shared channel; and e) determining whether the data are addressed to a particular remote unit based on a control code.

* * * * *